United States Patent [19]

Fagerburg et al.

[11] Patent Number: 4,977,236

[45] Date of Patent: Dec. 11, 1990

[54] TERMINATED COPOLY(ARYLENE SULFIDE) OF LOW MOLECULAR WEIGHT

[75] Inventors: David R. Fagerburg; Joseph J. Watkins, both of Kingsport; Paul B. Lawrence, Blountville; Mark Rule, Kingsport, all of Tenn.

[73] Assignee: Eastman Kodak Company, Rochester, N.Y.

[21] Appl. No.: 449,289

[22] Filed: Dec. 5, 1989

Related U.S. Application Data

[63] Continuation of Ser. No. 364,757, Jun. 12, 1989, abandoned.

[51] Int. Cl.$^5$ .............................................. C08G 75/14
[52] U.S. Cl. ..................... 528/226; 568/23; 568/25; 568/57; 568/58; 560/18; 564/430; 528/364; 528/389
[58] Field of Search ................ 568/23, 25, 57, 58; 528/389, 226, 364; 564/430; 560/18

[56] References Cited

U.S. PATENT DOCUMENTS

| | | | |
|---|---|---|---|
| 2,198,828 | 4/1940 | Lieber et al. | 568/23 |
| 2,538,941 | 1/1951 | Macallum | 568/25 |
| 2,629,743 | 2/1953 | Burnette et al. | 568/23 |
| 3,354,129 | 11/1967 | Edmonds, Jr. et al. | |
| 3,845,013 | 10/1974 | Robin et al. | 568/23 |
| 3,878,176 | 4/1975 | Moberly | |
| 4,605,732 | 8/1986 | Heitz et al. | 525/537 |
| 4,645,825 | 2/1987 | Idel et al. | |
| 4,645,826 | 2/1987 | Iizuka et al. | |
| 4,786,713 | 11/1988 | Rule et al. | |

FOREIGN PATENT DOCUMENTS 1065447  4/1967  United Kingdom .................. 568/25

Primary Examiner—Lewis T. Jacobs
Assistant Examiner—David W. Woodward
Attorney, Agent, or Firm—Charles R. Martin; Willima P. Heath, Jr.

[57] ABSTRACT

A process for preparation of a copoly(arylene sulfide) corresponding to the structure

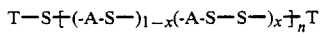

wherein A is a divalent substituted or unsubstituted aromatic radical, T is a monovalent aromatic radical, x is in the range of 0.5 to 0.001 and n is an integer from 1 to 100.

7 Claims, No Drawings

TERMINATED COPOLY(ARYLENE SULFIDE) OF LOW MOLECULAR WEIGHT

This is a continuation of application Ser. No. 07/364,757 filed on June 12, 1989, now abandoned.

The invention relates to a terminated copoly(arylene sulfide) of low molecular weight prepared by heating a diiodo aromatic compound and a small amount of a monoiodo aromatic compound in the presence of elemental sulphur. The monoiodo compound acts as a chain terminator.

Poly(arylene sulfide) (PAS) resins are thermoplastic polymeric materials with good thermal stability, unusual insolubility, resistance to chemical environments and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

U.S. Pat. No. 4,645,826 discloses a process of preparing "ultra-high molecular weight" linear PAS by first preparing a prepolymer with a melt viscosity between 5,000–3,000 poise and then performing a liquid-liquid two-phase polymerization. Only dichloroaromatic compounds are disclosed and the prepolymer is formed using a conventional alkaline metal sulfide. The prepolymer is formed by a standard Edmonds-Hill polymerization in the presence of an alkali metal sulfide. Accordingly, the polymers produced will suffer from the problems associated with residual salt content noted below. These polymers are also thought to contain no substantial quantities of disulfide units.

U.S. Pat. No. 4,645,825 also discloses poly(arylene sulfide) produced using dichloroaromatic or dibromoaromatic compounds and polymerizing in the presence of conventional alkaline metal sulfides or hydrosulfides. Although polymers with relatively high molecular weights and melt viscosities can be produced by this process, the presence of residual inorganic salts in the polymer results in inferior corrosion characteristics as well as poorer spinning and drawing capability. These polymers are also though to have no substantial quantities of disulfide units.

Ser. No. 219,123 now U.S. Pat. No. 4,952,671, discloses a polymer similar to the polymer of this invention.

We have now discovered a terminated copoly(arylene sulfide) which is identical to the terminated polymer disclosed in Ser. No. 219,123 but has a lower molecular weight.

The copoly(arylene sulfide) of this invention can be broadly described as corresponding to the structure

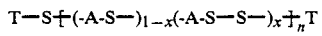

wherein A is a divalent substituted or unsubstituted aromatic radical, T is a monovalent aromatic radical, x is in the range of 0.5 to 0.001 and n is an integer from 1 to 100.

The vast majority of repeating units in the terminated copolymer of this invention are the (-A-S-) unit and the number of (-A-S-S-) or disulfide units are small compared to the number of (-A-S-) units. Generally, the fraction of (-A-S-S-) units is in the range of 0.5 to 0.001, based on the combined number of both (-A-S-) and (-A-S-S-) units. Thus, the repeating portion of the copolymer can be represented as

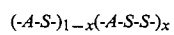

The size of the polymer chain can conveniently be expressed as the total number of each kind of unit in the chain. Therefore, the repeating portion of the terminated copoly(arylene sulfide) of this invention can be more specifically expressed as corresponding to the structure

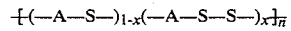

wherein n, the degree of polymerization, is in the range of 1 to 100, as determined by the terminator level present ratioed to the sulfur source in the reaction mixture. In one embodiment of the invention wherein n is in the range of 1 to 20 the copoly(arylene sulfide) is useful as a high temperature heat temperature fluid. In this embodiment the copoly(arylene sulfide) is used as a high temperature heat transfer fluid by virtue of having a melting point below about 100° C. and preferably below about 40° C. and having a boiling point above 260° C. at atmospheric pressure and preferably above 280° C. at atmospheric pressure. In addition, these fluids have excellent oxidative stability and resistance to thermal degradation. In another embodiment of the invention wherein n is in the range of 20 to 100 the copoly(arylene sulfide) is useful as a flow aid. In this embodiment the copoly(arylene sulfide) is used as a flow aid by mixing with a poly(arylene sulfide) as specified in U.S. Pat. No. 4,786,713 in an amount not to exceed 20 wt % of the total blend and more preferably not more than 10 wt % of the total blend. In the process used to prepare the terminated copoly(arylene sulfide) of this invention a diiodoarylene compound corresponding to the structure where A is a divalent arylene radical is reacted with the monoiodo aromatic compound and elemental sulfur to produce a substantially linear terminated copoly(arylene sulfide) having both (-A-S-) units and (-A-S-S-) units.

Diiodoaromatic compounds which can be utilized include unsubstituted or substituted aromatics which have two iodine substituents. Suitable diiodo aromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical oxygen-containing aromatics include, for example, furan, dibenzofuran, etc. Substituted diiodo aromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1–6 carbon atoms. Specially preferred alkyl groups are methyl, ethyl, propyl and butyl groups. There is no limitation on the spatial arrangement of the substituents, for example, the substituents maybe on a carbon adjacent to an iodine bearing carbon or may be on a carbon atom further removed from the iodine bearing carbon.

Additionally substituents on the aromatics compounds may include phenyl, halogen, hydroxy, nitro, amino, $C_1$-$C_2$ alkoxy, and carboxylate esters substituents, as well as aryl sulfones and aryl ketones.

Preferred diiodo aromatic compounds are the diiodobenzenes, diiodonaphthalenes, diiodobiphenyls, diiododiphenyl ethers and diiodotoluenes which may be unsubstituted or substituted with any of the substituents noted above.

Specific diiodo aromatic compound suitable for the present invention include p-diiodobenzene, m-diiodobenzene, p,p'-diiodobiphenyl, m,p,-diiodobiphenyl, p,p'-diiododiphenyl sulfone, p,p'-diiododiphenyl ether, 2,6-diiodonaphthalene, and p,p'-diiodobenzophenone. p-Diiodobenzene, p,p'-diiodobiphenyl, and p,p'-diiododiphenyl ether are most preferred.

The diiodo aromatic starting materials of the present invention may be prepared by any suitable process, such as the reaction of iodine and an organic compound in the presence of a zeolite catalyst.

In accordance with this invention the copoly(arylene sulfide) is terminated with a monovalent radical contributed from a monoiodo aromatic compound. Although broadly any monoiodo aromatic compound can be used to contribute the terminating radical T, it is preferable that the boiling point of the compound be above 200° C. at atmospheric pressure and more preferable that the boiling point be above 230° C. Preferred monovalent radicals are

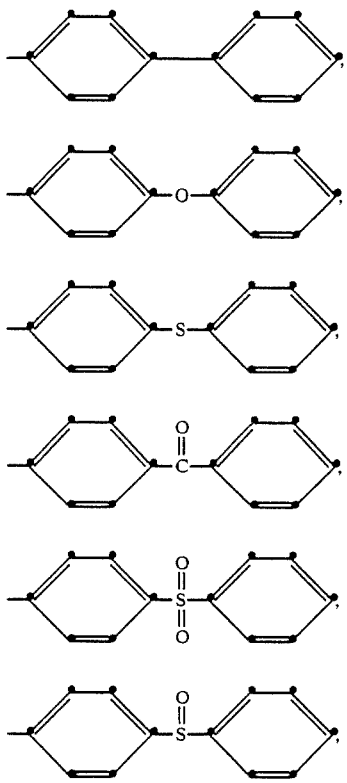

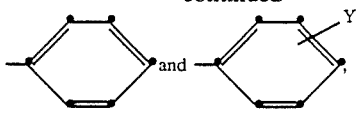

where Y is selected from the group consisting of -$NO_2$, -NH, -OR, and -COOR where R is alkyl from 1 to 4 carbons. The most preferred radical is

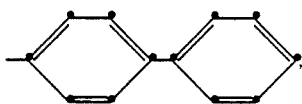

As will be understood by those skilled in the art, all of these radicals are contributed by the monoiodo analogue of the radical, such as 4-iodobiphenyl ether and 4-iododiphenyl sulfone.

The amount of monoiodo aromatic compound used to contribute terminating radical T varies widely in accordance with the desired molecular weight of the copolymer. For higher molecular weight copolymers as little as 1 mole of monoiodo aromatic compound for each 50 moles of diiodo aromatic may be employed. If lower molecular weights are desired, the ratio of monoiodo aromatic compound to diiodo aromatic compound can be as low as 1 to 1 or even 1 to 0.5. The monoiodo aromatic compound can be added at any convenient time during the polymerization but will generally be added at the start of the reaction as a matter of convenience.

Sulfur is reacted as elemental sulfur and may consist of any of the standard forms which are possible for elemental sulfur. That is, the sulfur may be present in any of its allotropic modifications such as orthorhombic cycloctasulfur ($S_8$) or any other cyclic elemental sulfur such as any of the cyclosulfur species having 6.12 sulfur atoms. Additionally, any crystalline form of sulfur may be used in the present reaction. Surprisingly, impurities in the elemental sulfur do not appear to affect the efficiency or selectively of the present polymerization reaction. The sulfur preferably has a purity of about 98%-100%, although sulfur having a lower degree of purity may be used. This lack of sensitivity is advantageous to the present process when used as a commercial process since highly purified sulfur is not required and the associated expense is not incurred.

In the precess used to prepare the co(polyarylene sulfide) of this invention sulfur reacts with a diiodo aromatic compound, eliminating elemental iodine and forming the PAS as shown below.

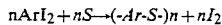

$$nArI_2 + nS \rightarrow (-Ar\text{-}S\text{-})_n + nI_2$$

The formation of polymer is not sensitive to the relative stoichiometry of the diiodo aromatic compound and sulfur. Accordingly, an excess of sulfur or an excess of diiodo aromatic compound may be used in the polymerization process. When excess sulfur is used, some disulfide linkages are observed in the polymer. Decreasing amounts of sulfur result in decreasing levels of disulfide linkages in the final polymer. When the diiodo aromatic compound is removed during final polymerization.

The polymerization reaction is preferably carried out in the absence of solvent by merely heating and reacting the sulfur, the diiodo aromatic compound and the monoiodo aromatic compound. Under these conditions, the diiodo aromatic compound itself acts as a solvent for the sulfur which is melted thereby forming a substantially homogeneous solution enable a facile and complete reaction.

In another embodiment, the diiodo aromatic compound monoiodo aromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodo aromatic compound which is being polymerized. Thus, for example, the polymerization of diiodobenzene with sulfur, one might use benzene, toluene or naphthalene as a solvent.

During the polymerization reaction between the diiodo aromatic compound, the monoiodo aromatic compound, and sulfur, elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodo aromatic compound. For most polymerization reactions, temperatures in the range of about 175°–400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodo aromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodo aromatic compound, the monoiodo aromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

Other features of the invention will become apparent in the course of the following descriptions of exemplary embodiments which are given for illustration of the invention and are not intended to be limiting thereof.

EXAMPLE 1

The example illustrates the preparation of a copoly(arylene sulfide) of this invention where n is about 2 and the copoly(arylene sulfide) is useful as a heat transfer fluid.

Into a 500 mL 3-neck round bottom flask are weighed the following: 19.4 g sulfur (0.606 mol), 400.0 g p-diiodobenzene (1.21 mol) and 132.4 g diphenyl disulfide (0.606 mol). The flask was fitted with a 350 mm long Vigreux column, a mechanical stirrer through the center joint, and an inlet tube for a slow air sweep. The column is attached via a distillation head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the bath temperature was raised to 250° C. The reaction pressure was then reduced to 120 torr, held there for 0.5 hr and the pressure reduced to 60 torr where it was held for and additional 30 min. The reaction flask was removed from the metal bath, repressurized with nitrogen, and allowed to cool under nitrogen. The product was a dark fluid at room temperature that exhibited utility as a heat transfer fluid with very high thermal stability.

EXAMPLE 2

This example illustrates preparation of a copoly(arylene sulfide) of this invention wherein n is about 25 and the copoly(arylene sulfide) is useful as a flow aid.

The procedure of Example 1 was repeated except for the following amount of reactants: 410.0 g (1.24 mol) p-diiodobenzene, 39 g (1.22 mol) sulfur and 27.34 g (0.098 mol) of 4-iodobiphenyl.

The product exhibited utility as a flow aid by mixing with poly(phenylene sulfide) of high melt viscosity at 5 wt % of the polymer of this example. Flow during injection molding was improved.

EXAMPLE 3

This example further illustrates the preparation of a copoly(arylene sulfide) of this invention where n is about 5 and the polymer is useful as a heat transfer fluid.

The procedure of Example 1 was repeated using the following reagents: 205 g (0.62 mol) m-diiodobenzene, 19.5 g (0.61 mol) sulfur, and 68.39 g (0.244 mol) of 4-iodobiphenyl. The reaction sequence was extended past the 60 torr stage by reduction of pressure to 30 torr for 30 min followed by reduction to 1 torr for 30 min.

The product was a liquid at room temperature which showed good heat transfer properties and good oxidative and thermal stability.

We claim:

1. A process for producing elemental iodine and a copoly(arylene sulfide) corresponding to the structure: wherein A is a divalent substituted or unsubstituted aromatic radical, T is a monovalent aromatic radical, x is in the range of 0.5 to 0.001 and n is an integer from 1 to 100, said process consisting essentially of
   (1) reacting at a temperature above about 175° C. a mixture of a diiodoaromatic compound which contributes the divalent radial A and a monoiodo aromatic compound which contributes the monovalent radical T and elemental sulfur to produce the elemental iodine and the copoly(arylene sulfide), and
   (2) recovering the elemental iodine.

2. The process of claim 1 wherein n is from 1 to 20.

3. The process of claim 1 wherein n is from 20 to 100.

4. The process of claim 1 wherein the aromatic radical is selected from the group consisting of phenylene, biphenylene, diphenyl ether, diphenyl sulfone, benzophenone, diphenoxybenzene and naphthalene.

5. The process of claim 4 wherein the aromatic radical is an unsubstituted phenylene or an unsubstituted biphenylene radical.

6. The process of claim 5 wherein the aromatic radical is unsubstituted phenylene.

7. The process of claim 1 wherein T is selected from the group consisting of

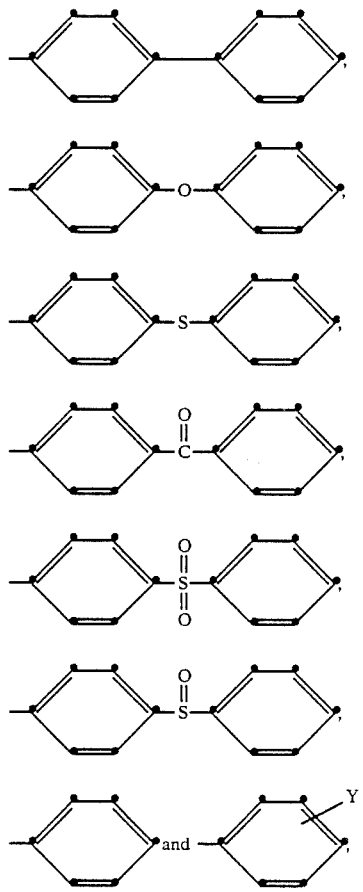

where Y is selected from the group consisting of -NO$_2$, -NH$_2$, -OR, and -COOR where R is alkyl and from 1 to 4 carbons.

UNITED STATES PATENT AND TRADEMARK OFFICE
CERTIFICATE OF CORRECTION

PATENT NO. : 4,977,236

DATED : December 11, 1990

INVENTOR(S) : David R. Fagerburg, Joseph J. Watkins, Paul B. Lawrence and Mark Rule It is certified that error appears in the above-identified patent and that said Letters Patent is hereby corrected as shown below:

Column 7, Line 6, Claim 1, the following formula should appear after the word structure:

Signed and Sealed this

Nineteenth Day of May, 1992

*Attest:*

DOUGLAS B. COMER

*Attesting Officer*   *Acting Commissioner of Patents and Trademarks*